June 5, 1945.   G. B. COOKE ET AL   2,377,402
CAP
Filed April 2, 1942
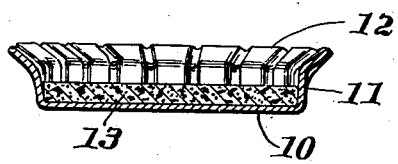
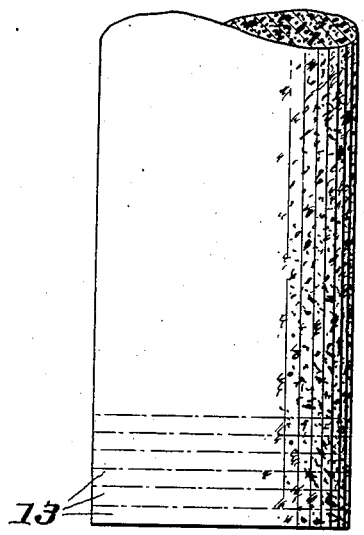
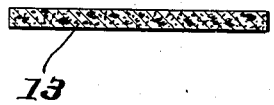
Inventors:
Victor A. Ryan,
Giles B. Cooke,
By Cushman Darby and Cushman
Attorneys.

Patented June 5, 1945

2,377,402

UNITED STATES PATENT OFFICE 2,377,402

CAP

Giles B. Cooke and Victor A. Ryan, Baltimore, Md., assignors to Crown Cork & Seal Company, Inc., Baltimore, Md., a corporation of New York Application April 2, 1942, Serial No. 437,454

3 Claims. (Cl. 215—40)

This invention relates to caps, such as crown closures, which employ liners of compressible cork composition in order to effect a permanently tight seal at the lip of bottles, cans, and other containers for beverages and food products. Composition cork for such cushion liners consists of particles of cork united by a binder and formed into a compressible body in which the cork predominates by volume. The cork adhesives employed are generally satisfactory, but in some cases, have the objections of imparting odor and off-flavors and in other instances, are not sufficiently moisture resistant. Moreover, resins and hide glues which are frequently used have recently become both difficult and costly to obtain.

It is an object of this invention to provide caps wherein the cushion liners of cork composition are odorless and tasteless and possess increased moisture resistance, in addition to being acid resistant and having high tensile strength.

Another object of the invention is to provide caps wherein the cushion liners do not deteriorate in storage and are unaffected by sterilizing and pasteurizing temperatures to which beverages and foods are frequently subjected.

Of equal importance with the foregoing, it is a further object of the invention to provide caps having cork composition liners in which the binder is a product obtained by combining a protein, such as zein, and fatty acids, typified by those present in shellac, and dissolving the binder in a polyhydric alcohol solvent, e. g., glycerine, which is a plasticizer or softener for the cork. We have discovered that, whereas neither zein nor shellac are soluble in glycerine, when solutions of these two substances are brought together and heated, zein reacts with shellac and the product formed thereby is soluble in glycerine. This solution has the two-fold advantage first, of providing a binder which may be set in the usual manner by baking, and second, of including a non-volatile solvent which retards drying-out of the cork composition and retains the same soft and compressible. Apparently, the protein of the zein, such as mazein, and the fatty acids of the shellac, in the presence of each other, undergo chemical change and react to form an improved cork binder which is soluble in glycerine. This discovery has enabled the production of cork composition suitable for cap liners which is characterized by improved moisture resistance and of particular significance, in the case of such delicately flavored pressure beverages, as beer, ginger ale, and other soft drinks, the use of the improved cork composition is marked by the absence of odor or the imparting of off-taste to the products; in fact tests reveal the complete absence of any extracted substances from the binder to affect the taste of the beverages.

In preparing our improved binder, the shellac is dissolved in ethyl or denatured alcohol and the zein, such as mazein, is dissolved in propylene glycol. We have found that the zein is readily soluble in the glycol and this is of advantage since the latter is also a cork plasticizer, although it is not so satisfactory as glycerine for the purpose. The shellac is not readily soluble in the glycol. The solutions are viscous and are usually warmed to temperatures between 120° F. and 140° F. and then brought together and stirred. The combined solutions may then be heated further to a temperature of about 120° F. or slightly thereabove to accelerate reaction. Thereupon a cork plasticizer, preferably a polyhydric alcohol, such as glycerine, is added and the mass, if desired, may be heated for thirty minutes at 120° F.

As explained above, the zein and shellac are not soluble in glycerine, but when brought together as above described, they appear to undergo chemical change and their reaction product is readily soluble in the glycerine, which is a highly desirable cork softener, due to its relatively high boiling point. We believe that the reaction takes place between the protein of the zein and the fatty acids of the shellac and the solubility of the reaction product in a substantially non-volatile polyhydric alcohol cork plasticizer is advantageous for reasons already explained.

As one example, about fifty parts shellac dissolved in about fifty parts alcohol and about fifty parts mazein are dissolved in about fifty parts propylene glycol. After the solutions have been warmed they are mixed together and stirred and the combined solutions may be heated to a temperature of about 120° F. to promote the reaction. Thereupon, about 46.5 parts of glycerine are added and the mass is heated to a temperature of about 120° F. for thirty minutes or less.

The viscosity of the composition can be regulated by varying the amounts of alcohol, propylene glycol and glycerine. Also, while substantially equal parts by weight are preferred, the mazein and shellac may be present within the range of forty to sixty parts by weight.

Instead of propylene glycol, others of the glycols may be used, such as ethylene glycol or other polyhydric alcohols, but propylene glycol is preferred, since for capping beverages and foods, it is particularly useful because it is non-toxic.

Granulated cork is coated with a free flowing adhesive prepared in accordance with the foregoing formula by using forty-nine parts shellac-protein adhesive, three parts formaldehyde as a tanning agent and one hundred parts comminuted cork. For extrusion purposes, a lubricant may be added to the mixture, such as ceresin wax in about ten parts, which will enable the composition to slide freely through the extrusion apparatus.

Three inch rods prepared from the binder coated cork, as for example by extrusion or moulding, are baked for about one hour at substantially 280° F. to 300° F. in hot air to set the binder and the rods may then be severed into cushion discs for assembly into the caps. Where large round blocks are being made, the same are heated at about 280° F. to 300° F. for substantially five hours. The composition may be sliced into sheets of predetermined length, width and thickness, or into continuous strips of ribbon cork.

The cork composition has high tensile strength, e. g., 174 pounds per square inch, improved moisture resistance over present similar products and in regard to its acid resistance, tests show that the cork composition is resistant to boiling hydrochloric acid. Moreover, there is no objectionable odor and in actual bottling tests nothing could be extracted from the cork binder to affect the test of the beverages.

The improved cork composition also is satisfactory from the standpoint of compressibility in that under a weight of 100 pounds per square inch, the shellac protein discs were compressed 24.6 per cent and, upon release of pressure, recovery took place to an extent greater than 99 per cent in less than one minute.

The hardness of the cork composition can be regulated by the amount of polyhydric alcohol present. For instance, relatively hard sheets may be desired, in which case a relatively small amount of glycerine is present, whereas for cushion liners for caps, the amount of glycerine may be substantially increased so as to be within the proportions described in the foregoing examples.

The various constituents of the binder are combined in amounts and are of such character as to produce a reaction product which may be set by heat and which binder is moisture-resistant and resistant to acids, as well as having a high tensile strength. Of equal importance with these characteristics, the binder is odorless and tasteless and is thus highly satisfactory for the packaging of beverages and foods.

For a more complete understanding of the invention, we have illustrated the same in the accompanying drawing, wherein:

Figure 1 is a sectional view of a crown cap having a cushion liner therein made in accordance with this invention.

Figure 2 is an elevation of a rod of the cork composition from which the discs of Figure 1 are severed, and Figure 3 is a sectional view of one of the discs severed from the rod shown in Figure 2.

While we have illustrated a crown cap, it is to be understood that the invention is equally applicable with various types of caps and wherever a tight seal is desired between the cap and the lip surface of a container to be sealed.

The cork composition is particularly useful as a sealing liner for caps, but may be used generally for sealing purposes and may be in the form of rings, blocks, sheets and, in fact, any desired shape or size to accomplish the sealing function.

The cap shown in Figure 1 has a top 10 and a skirt 11, provided with the usual crimps 12. The cushion liner is shown at 13 and is assembled in the cap and adhered thereto in any suitable manner.

The rod shown in Figure 2 is prepared by extruding the cork composition under any suitable pressure, so as to give the required density and, after baking, to set the binder, the rod is suitably severed as shown in broken lines to form the discs 13. Such discs may be of any suitable diameter and thickness and the density may be controlled by the proportion of ingredients and the pressure to which they are subjected.

In the baking operation, whereby the binder is set, the high boiling, substantially non-volatile polyhydric alcohol cork plasticizer remains substantially constant in amount and in the final product is available to maintain the cork plastic and soft for a very substantial period of time.

The relative proportions of cork and binder employed may, of course, be varied, but, in all cases, the cork should predominate by volume and the binder is used in amount effective to tenaciously adhere the particles, so that a compressible body of high tensile strength is formed. The tanning agent will be used in amounts sufficient to tan or harden the adhesive.

We claim:

1. A cap having a cushion liner of cork composition, the particles of cork being bonded by a reaction product of zein and shellac dissolved in glycerine, the glycerine being in amount to form a cork-softener for the cork composition.

2. A cork composition in which the cork particles are bonded by a reaction product of zein and shellac dissolved in glycerine, the glycerine being in amount to form a cork-softener for the cork composition.

3. The method of making a cork composition comprising spreading on the cork particles a binder which is a reaction product of zein and shellac dissolved in glycerine, the glycerine being in amount to form a cork-softener for the cork composition, shaping the cork composition, and baking the material at a temperature which will set the binder without substantially affecting said glycerine.

GILES B. COOKE.
VICTOR A. RYAN.